(12) United States Patent
Polisetty et al.

(10) Patent No.: US 8,780,978 B2
(45) Date of Patent: Jul. 15, 2014

(54) CONTROLLING VIDEO ENCODING USING AUDIO INFORMATION

(75) Inventors: Chandra Mouli Polisetty, Hyderabad (IN); Aditya Bhuvanagiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 12/612,104

(22) Filed: Nov. 4, 2009

(65) Prior Publication Data

US 2011/0103468 A1  May 5, 2011

(51) Int. Cl.
| | |
|---|---|
| H04N 7/12 | (2006.01) |
| H04N 7/50 | (2006.01) |
| H04N 21/2343 | (2011.01) |
| H04N 21/233 | (2011.01) |
| H04N 21/24 | (2011.01) |
| H04N 7/26 | (2006.01) |
| G10L 25/78 | (2013.01) |
| H04N 7/14 | (2006.01) |

(52) U.S. Cl.
CPC ......... *H04N 7/50* (2013.01); *H04N 21/234381* (2013.01); *H04N 21/233* (2013.01); *H04N 21/2402* (2013.01); *H04N 7/26111* (2013.01); *H04N 21/234363* (2013.01); *G10L 25/78* (2013.01); *H04N 7/26079* (2013.01); *H04N 7/26053* (2013.01); *H04N 7/148* (2013.01)
USPC .................................................. 375/240.03

(58) Field of Classification Search
CPC ....................................................... H04N 7/50
USPC .................................................. 375/240.03
See application file for complete search history.

(56) References Cited

U.S. PATENT DOCUMENTS 5,260,783 A * 11/1993 Dixit ........................ 375/240.13
5,617,145 A *  4/1997 Huang et al. ............... 348/423.1

(Continued)

FOREIGN PATENT DOCUMENTS

| EP | 1613018 A2 | 1/2006 |
|---|---|---|
| GB | 2384932 A | 8/2003 |
| WO | WO2007103412 A2 | 9/2007 |

OTHER PUBLICATIONS

A. Sollaud, G.729.1 RTP Payload Format Update: Discontinuous Transmission (DTX) Support, Request for Comment (RFC) 5459, Jan. 2009, available at http://tools.ietf.org/html/rfc5459.

(Continued)

*Primary Examiner* — Geepy Pe
*Assistant Examiner* — James Pontius
(74) *Attorney, Agent, or Firm* — Heejong Yoo

(57) ABSTRACT

A video encoder may reduce bandwidth consumption by skipping encoding of or reducing an encoding rate of video frames corresponding to silent audio frames, that is, audio frames that do not include speech data. In one example, an apparatus includes a video encoder comprising a coding unit configured to encode video data in a first or second mode and a mode select unit configured to receive an indication of whether encoded audio data corresponding to the video data to be encoded includes speech data. When the audio data includes speech data, the mode select unit selects the first mode, and when the audio data does not include speech data, the mode select unit selects the second mode. The second mode consumes relatively less bandwidth, e.g., by reducing a bitrate, modifying a quantization parameter to increase quantization, and/or reducing a frame rate relative to the first mode.

30 Claims, 9 Drawing Sheets

(56) References Cited

U.S. PATENT DOCUMENTS

| | | | |
|---|---|---|---|
| 5,684,527 | A | 11/1997 | Terui et al. |
| 6,373,855 | B1* | 4/2002 | Downing et al. ............. 370/468 |
| 6,987,728 | B2* | 1/2006 | Deshpande .................. 370/229 |
| 7,446,795 | B2* | 11/2008 | Rengaraju et al. ......... 348/14.01 |
| 2003/0149724 | A1 | 8/2003 | Chang |
| 2004/0263610 | A1* | 12/2004 | Whynot et al. ............ 348/14.08 |
| 2005/0182623 | A1* | 8/2005 | Shalem ........................ 704/229 |
| 2006/0227868 | A1* | 10/2006 | Chen et al. ............... 375/240.03 |
| 2007/0019931 | A1* | 1/2007 | Sirbu ............................. 386/96 |
| 2007/0211141 | A1* | 9/2007 | Christiansen ............. 348/14.08 |
| 2007/0236605 | A1* | 10/2007 | Saito et al. .................... 348/512 |
| 2008/0043644 | A1* | 2/2008 | Barkley et al. ................ 370/261 |

OTHER PUBLICATIONS

A. Sollaud, RTP Payload Format for the G.729,1 Audio Codec, Request for Comment (RFC) 4749, Oct. 2006, available at http://tools.ietf.org/html/rfc4749.

Furini M et al: "A video frame dropping mechanism based on audio perception", Global Telecommunications Conference Workshops, 2004. Globecom Worksho ps 2004. IEEE Dallas, TX, USA Nov. 29-Dec. 3, 2004, Piscataway, NJ, USA, IEEE, Nov. 29, 2004, pp. 211-216, XP010783877, DOI: DOI: 10.1109/GLOCOMW. 2004. 1417574 ISBN: 978-0-7803-8798-0 sections I and II.

Furini M et al: "An audio-video summarization scheme based on audio and video analysis" Consumer Communications and Networking Conference, 2006. CCNC 2006. 2006 3RD IEEE Las Vegas, NV, USA Jan. 8-10, 2006, Piscataway, NJ, USA, IEEE, vol. 2, Jan. 8, 2006, pp. 1209-1213, XP010893374, DOI: DOI: 10.1109/CCNC. 2006.1593230 ISBN: 978-1-4244-0085-0 section II.

International Search Report—PCT/US2010/055406—ISA/EPO—Jan. 14, 2011.

Taiwan Search Report—TW099137987—TIPO—Jun. 17, 2013.

Written Opinion—PCT/US2010/055406—ISA/EPO—Jan. 14, 2011.

\* cited by examiner

CONTROLLING VIDEO ENCODING USING AUDIO INFORMATION

TECHNICAL FIELD

This disclosure relates to video encoding in conjunction with audio encoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for encoding video data based on corresponding audio information. The techniques involve controlling video encoding video data according to silence information associated with audio data that correspond to the video units. In one example, an audio encoder may encode an audio unit including an indication as to whether the audio frame includes speech or not, e.g., whether the audio frame is silent. A video encoder may receive the audio information for video data corresponding to the audio data and control encoding of the video data based on the indication of whether the audio data is silent. When the audio data is not silent, for example, the video encoder may encode the video data in a first mode. When the audio data is silent (e.g., does not include speech data), however, the video encoder may encoded the video data in second mode, different from the first mode. The second mode may be a modified mode that is selected to conserve bandwidth.

In one example, a method includes receiving, with a video encoder, an indication of whether encoded audio data corresponding to video data to be encoded includes speech data, when the audio data includes speech data, encoding the corresponding video data in a first mode, and when the audio data does not include speech data, encoding the video data in a second mode different from the first mode.

In another example, an apparatus includes a video encoder comprising a coding unit configured to encode video data in a first mode or a second, different mode, and a mode select unit configured to receive an indication of whether encoded audio data corresponding to the video data to be encoded includes speech data, wherein when the audio data includes speech data, the mode select unit sends a signal to the coding unit to encode the video data in the first mode, and wherein when the audio data does not include speech data, the mode select unit sends a signal to the coding unit to encode the video data in the second mode.

In another example, an apparatus includes means for receiving an indication of whether encoded audio data corresponding to video data to be encoded includes speech data, means for encoding the corresponding video data in a first mode when the audio data includes speech data, and means for encoding the video data in a second mode different from the first mode when the audio data does not include speech data.

The techniques described in this disclosure may be implemented in hardware, software, firmware, or any combination thereof. If implemented in hardware, an apparatus may be realized as an integrated circuit, a processor, discrete logic circuitry, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

In another example, a computer-readable storage medium is encoded with instructions for causing a programmable processor of a video coding apparatus to receive an indication of whether encoded audio data corresponding to video data to be encoded includes speech data, when the audio data includes speech data, encode the corresponding video data in a first mode, and, when the audio data does not include speech data, encode the video data in a second mode different from the first mode.

The details of one or more examples are set forth in the accompanying drawings and the description below. Other features, objects, and advantages will be apparent from the description and drawings, and from the claims.

DETAILED DESCRIPTION

Figure 1:
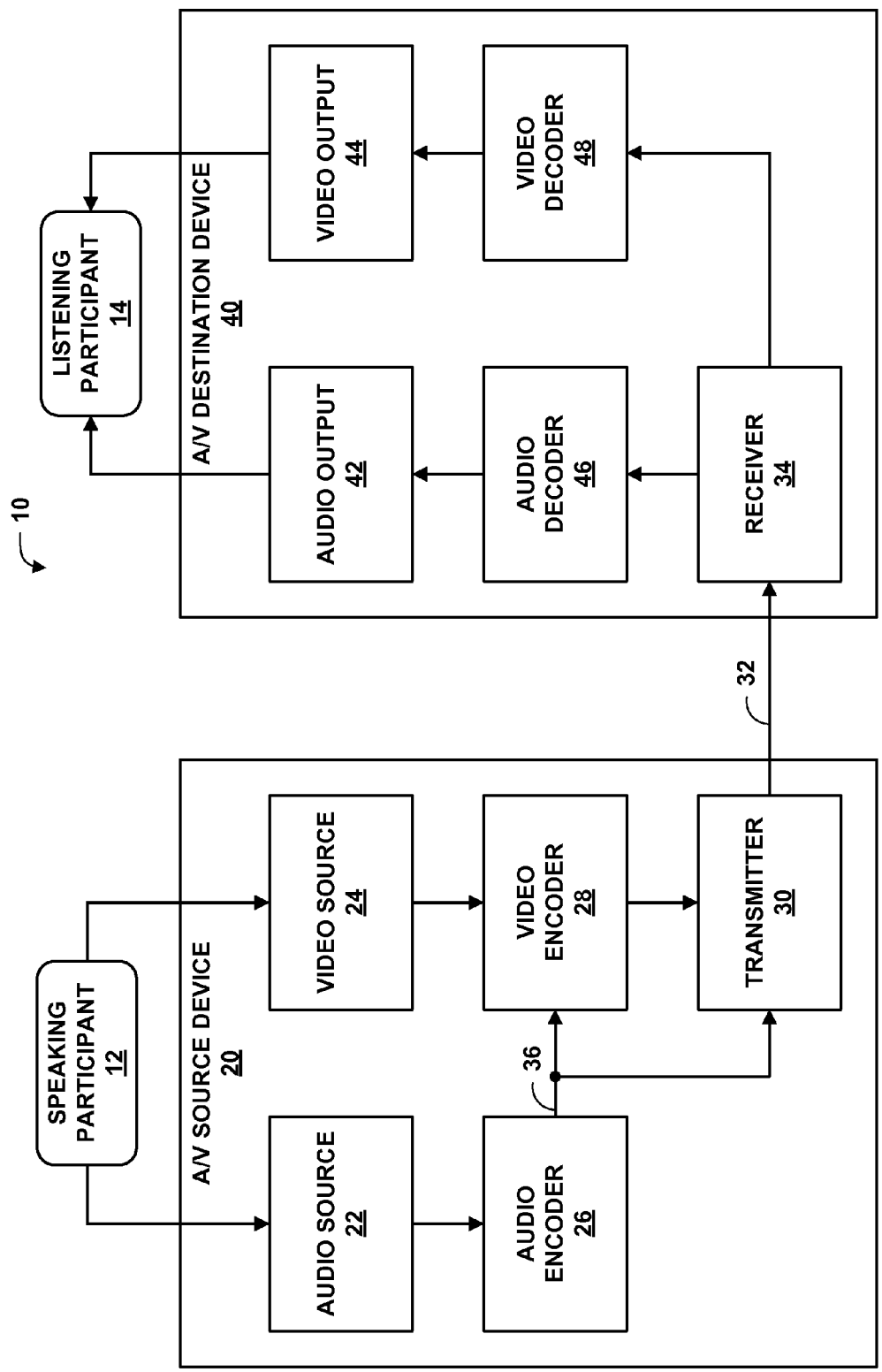
FIG. 1 is a block diagram illustrating an example system in which an audio/video (A/V) source device is configured to selectively encode video data according to silence information of corresponding encoded audio data.

In general, the techniques of this disclosure relate to the use of audio data to control encoding of corresponding video data. The video and audio data may be video and audio units such as frames, although other video or audio units. Examples of other video units include video slices and video blocks. Video and audio frames will be described in this disclosure for purposes of illustration. Video encoders may perform rate control, such as frame rate or encoding bit rate control, using information that is present in the video stream. The techniques described in this disclosure recognize that additional video compression can be achieved by making use of silence information associated with audio data. The silence information may be associated with speech generated by an audio encoder or a voice encoder (vocoder).

When an audio encoder encodes an audio frame, the audio encoder may include an indication in the encoded audio frame that describes whether the audio frame is silent. The indication may take the form of information, such as a "frame type" field, that indicates whether the audio frame is silent. Because a speaking person naturally pauses at various intervals, e.g., to allow another person to speak, a typical voice call will have interleaved and/or embedded silence and speech.

In some audio encoding techniques, audio frames may include a frame type (FT) field that indicates an encoding rate for the audio frame. A value of "15" for the FT field indicates that the encoding rate corresponds to "NO_DATA," as described by "RTP Payload Format for the G.729.1 Audio Codec," by A. Sollaud, Network Working Group, Request for Comment (RFC) 4749, October 2006. An audio frame having "NO_DATA" indicates that the audio frame is a silent frame, i.e., a frame that contains no speech. Accordingly, an audio encoder may include a frame type field in a header of an audio frame that indicates whether the audio frame is silent, e.g., having a value of "15" in one example to indicate that the audio frame is silent. Although generally described as a "silent" frame, it should be understood that the term "silent," with respect to an encoded audio frame, indicates that the audio frame does not include sounds corresponding to speech (e.g., one or more speech phonemes). Accordingly, a "silent" encoded audio frame may include non-speech sounds, such as background noise.

For example, as described by "G.729.1 RTP Payload Format Update: Discontinuous Transmission (DTX) Support," by A. Sollaud, Network Working Group, RFC 5459, January 2009, an audio encoder may include a silence insertion descriptor (SID) in an encoded audio frame that the audio encoder determines includes no speech. That is, in accordance with discontinuous transmission (DTX) mode audio encoding, an audio encoder that encodes the audio frame in DTX mode may make a decision as to whether an input audio frame is speech or silence. In some examples, the audio encoder periodically includes a SID so that, when a person is not speaking, natural background noise can be reproduced by an audio decoder with minimal bandwidth utilization. In some examples, an audio encoder includes a SID in one out of every eight consecutive silent audio frames. As described by RFC 5459, the frame type of an audio frame comprising a SID has a frame type value of "14." Accordingly, an audio encoder may include a SID in an audio frame that does not include speech, e.g., an audio frame that is silent or that includes only background noise but that does not include speech, as well as a frame type value of "14" to indicate presence of the SID.

In accordance with the techniques of this disclosure, a video encoder may analyze information associated with an audio frame to make video encoding decisions for corresponding video frames. The information may include metadata such as frame type field data or SIDs. The techniques of this disclosure recognize that, during a video teleconference, motion such as facial movement is typically related to speech. A video encoder may determine a video frame rate and encoded output size, i.e., size of an encoded video unit, based on motion in the video data, and quality or bitrate of another encoded frame, such as a previous, next or subsequent encoded frame, may depend on motion and a previous frame's output bitrate.

The techniques of this disclosure provide that, in addition to existing information from motion, a video encoder can make use of information relating to silence frames (for example, SID or a value of a frame type field) in speech content to make decisions for (1) quality of video that is sent, and (2) either to send an encoded video frame or to send skipped macroblocks, skipped video frames, or frames encoded at a reduced encoding rate. Either or both decisions may reduce the bandwidth used, e.g., in a video call or conference call. For example, the video encoder may retrieve frame type data from a frame type field of an audio frame header.

The video encoder may further determine whether the audio frame is a silent frame by analyzing the information of the audio data. When the video encoder determines that an audio frame is silent, e.g., that the frame type has a value of "14" or "15" in various examples, the video encoder may skip encoding of corresponding video frames. Alternatively, the video encoder may reduce a coding rate of video frames corresponding to silent audio frames, e.g., by reducing a frame rate for encoding consecutive video frames corresponding to consecutive silent audio frames, reducing a bitrate for encoding video frames, and/or increasing a quantization parameter for encoding video frames.

As an example, when a participant of a video teleconference is speaking, an audio encoder may encode audio frames and indicate that the audio frames are not silent, and a video encoder may encode corresponding video frames in a first mode. However, when a participant of the video teleconference is not speaking, an audio encoder may encode audio frames and indicate that the audio frames are silent, and a video encoder may encode corresponding video frames in a second mode different from the first mode. The second video encoding mode may be selected based on the detection of a silent audio frame. For example, in the second mode, the video encoder may skip encoding of corresponding video frames or reduce the encoding level (e.g., reduce a bit rate or adjust a quantization parameter) of the corresponding video frames. These techniques may result in a trade-off between quality of the video and efficient bandwidth utilization. The second mode may result in reduced bandwidth utilization when transmitting video data encoded in the second mode, e.g., as a result of skipping encoding of certain portions of the video data and/or encoding the video data at a reduced encoding rate, e.g., by reducing a bit rate for encoding or altering a quantization parameter to increase quantization of the video data during encoding.

In this manner, a video encoder may improve efficient utilization of bandwidth, e.g., in a relatively low-bandwidth environment, such as a video teleconference. Participants in the video teleconference may find viewing video of a speaking participant more important than viewing video of a person who is remaining silent, as observation of movement of the speaking participant may be helpful in communication. Accordingly, the techniques of this disclosure may enable preferential allocation of bandwidth to video segments in which a participant is speaking, where bandwidth is allocated away from participants who are remaining silent. Therefore, participants in a video teleconference in which these techniques are used may receive higher quality video of participants who are speaking, because a higher amount of bandwidth may be allocated to the speaking participants. This may be desirable so that listening participants are able to clearly view the speaking participant's movements, hand gestures, facial expressions, and enunciation, which may enable the listeners to better understand what the speaking participant is saying and provide for a higher quality video teleconference experience.

FIG. 1 is a block diagram illustrating an example system 10 in which audio/video (A/V) source device 20 selectively encodes video frames according to silence information of corresponding encoded audio frames. In particular, in the example of FIG. 1, A/V source device 20 comprises audio encoder 26 and video encoder 28, and video encoder 28 makes video encoding determinations based on audio encoding information 36 received from audio encoder 26. Example system 10 of FIG. 1 may correspond to a video teleconference system. In some examples, A/V source device 20 and A/V destination device 40 may perform bidirectional information exchange, i.e., be capable of both encoding and decoding (and transmitting and receiving) audio and video data. An example of such a device is discussed in greater detail with respect to FIG. 2, below. In some examples, audio encoder 26 may comprise a voice encoder, also referred to as a vocoder.

A/V source device 20 may obtain audio and video data from speaking participant 12. A/V source device 20, in the example of FIG. 1, comprises audio source 22 and video source 24. Audio source 22 may comprise, for example, a microphone that produces audio data to be encoded by audio encoder 26. Video source 24 may comprise a video camera that produces video data to be encoded by video encoder 28. Raw audio and video data may comprise analog or digital data. Analog data may be digitized before being encoded by audio encoder 26 and/or video encoder 28. Audio source 22 obtains audio data from speaking participant 12 while speaking participant 12 is speaking, and video source 24 obtains video data of speaking participant 12. In other examples, audio source 22 may comprise a computer-readable storage medium comprising stored audio data, and video source 24 may comprise a computer-readable storage medium comprising stored video data. In this manner, the techniques described in this disclosure may be applied to live, streaming audio and video data or to archived audio and video data.

Audio encoder 26 may be configured to operate in a discontinuous transfer (DTX) encoding mode. Accordingly, audio encoder 26 may be configured to determine whether audio data obtained by audio source 22 from speaking participant 12 includes speech data. Audio encoder 26 may include information such as metadata in an encoded audio frame that indicates whether the encoded audio frame includes speech data. The metadata may comprise a frame type indicator or frame type value. The frame type indicator may be used to indicate an audio encoding mode, such as an audio encoding bitrate, in addition to indicating whether the encoded audio frame includes speech. In any case, at least one potential value of the frame type indicator may correspond to no speech being included in the encoded audio frame, i.e., indicating a silent frame.

As discussed above, in an example according to RFC 4749, the frame type value may comprise a value of "15" to indicate that there is no data in the encoded audio frame. In another example, according to RFC 5459, the frame type value may comprise a value of "14" to indicate that the encoded audio frame includes a silence insertion descriptor (SID). In general, an encoded audio frame comprising a SID may be regarded as a silent frame, i.e., a frame that does not include speech data. Although such an audio frame may include background noise data, the audio frame may still be regarded as a "silent" frame when the audio frame does not include speech data.

Audio encoder 26 may include an indication as to whether encoded audio frames include speech data or not. Audio encoder 26 sends encoded audio data 36 to video encoder 28. In some examples, audio encoder 26 may also send encoded audio data 36 to transmitter 30. In other examples, video encoder 28 may forward encoded audio data 36 to transmitter 30. In any case, video encoder 28 receives encoded audio frames 36 from audio encoder 26.

In accordance with the techniques of this disclosure, video encoder 28 may be configured to make video encoding decisions based on information such as metadata included in encoded audio frames 36. For example, when the information indicates that an encoded audio frame includes speech data, video encoder 28 may encode a corresponding video frame in a normal mode, but when the metadata indicates that the encoded audio frame does not include speech data, e.g., when the metadata indicates that the encoded audio frame comprises a silent frame, video encoder 28 may apply a second encoding mode. As an example, in the second mode, video encoder 28 may reduce an encoding rate for encoding the corresponding video frame and/or take other steps that may conserve bandwidth. In various examples, video encoder 28 may skip encoding of the corresponding video frame entirely, reduce an encoding bitrate of the video frame, or adjust a quantization parameter (QP) for performing quantization while encoding the video frame such that quantization is increased. In some examples, the video encoder may reduce a video frame rate to skip a certain number of video frames corresponding to a sequence of consecutive encoded audio frames that each comprise silent audio frames. When encoding of a frame is skipped, the video decoder may repeat an adjacent frame in place of the skipped frame or interpolate a skipped frame, in various examples. However, the encoder need not transmit a skipped frame.

In this manner, video encoder 28 may be configured to perform a method including receiving an encoded audio frame corresponding to a video frame to be encoded, determining whether metadata of the encoded audio frame indicates that the encoded audio frame includes speech data, and, when the metadata indicates that the audio frame does not include speech data, reducing an encoding rate for encoding the video frame corresponding to the encoded audio frame.

Audio frames that correspond to video frames are generally audio frames containing audio data that was captured by audio source 22 contemporaneously with video data captured by video source 24 that is contained within the video frames. That is, speaking participant 12 generally produces audio data by speaking, audio source 22 captures the audio data, and video source 24 captures video data of speaking participant 12 at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp. In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

It should also be understood that, in some examples, audio frames and video frames may correspond to different lengths of time, or different frame rates. For example, audio encoder 26 may encode audio frames that each represents 20 milliseconds (ms) of audio data. Video encoder 28 may encode video data at various frame rates, such as, for example, 15 frames per second, 30 frames per second, or 60 frames per second. Therefore, one audio frame may correspond to one video frame or a plurality of video frames. Likewise, one video frame may correspond to one audio frame or a plurality of audio frames. Accordingly, use of the phrase audio frame corresponding to a video frame should be understood to include any one of a plurality of video frames including video data that was captured at the same time as audio data included in any one of a plurality of audio frames.

In general, references to metadata of an encoded audio frame that indicates that the encoded audio frame includes speech data should be understood as metadata that represents a determination by audio encoder 26 as to whether the encoded audio frame described by the metadata includes speech data. In some examples, such metadata includes a value for a "frame type" field in the encoded audio frame. In other examples, the metadata may include a SID in the audio frame, or an indication that a SID is encoded by the audio frame. Other examples may use other metadata or similar representations as to whether the audio frame includes speech, e.g., a one-bit "speech" flag that is set when the audio frame includes speech data and that is cleared when the audio frame does not include speech data.

Reducing an encoding rate for encoding a video frame corresponding to an encoded audio frame including metadata that indicates that the encoded audio frame is silent may include one or more encoding rate reductions. Encoding rate reductions may include, for example, reduction in frame rate, reduction of a bitrate for encoding video frames, modification of a quantization parameter for quantizing encoded video frames, or entirely skipping encoding of all frames corresponding to a silent audio frame.

As an example, one audio frame may comprise 100 ms worth of audio data, and the video data may be encoded at 50 frames per second, which would result in one audio frame corresponding to five video frames. When audio encoder 26 encodes an audio frame in this example and includes metadata indicating that the audio frame is silent, video encoder 28 may reduce the encoding rate by encoding the first video frame of the five video frames to which the audio frame corresponds and skipping encoding of the other four video frames. Video encoder 28 may also reduce a frame rate by determining that a plurality of consecutive audio frames are each silent according to respective metadata of the audio frames and by selectively skipping encoding of a certain number of video frames to which the consecutive audio frames correspond.

As another example, video encoder 28 may reduce the encoding rate by optimizing a rate distortion cost according to a lower bitrate for video frames corresponding to silent audio frames, that is, audio frames including metadata indicating that those audio frames do not include speech data. Video encoder 28 may optimize rate distortion cost according to a lagrangian calculation using the equation "rate distortion cost=distortion+λ*rate," where distortion indicates distortion of a particular block (e.g., error calculated from SAD, SSD, MAD, MSD, or the like), lambda indicates a lagrangian multiplier, and rate indicates bit rate. That is, video encoder 28 may use a smaller value for "rate," representing bitrate allocated to an individual frame in the equation, and optimize the rate distortion cost according to the smaller bitrate value allocated to an individual frame.

As another example, video encoder 28 may reduce the encoding rate by skipping encoding of a video frame corresponding to a silent audio frame, that is, an audio frame that includes metadata indicating that the audio frame does not include speech data. For example, where a one-to-one relationship between audio frames and video frames exists, video encoder 28 may skip encoding of a video frame corresponding to a silent audio frame. As another example, where a one-to-many relationship between audio frames and video frames exists, video encoder 28 may skip encoding of each of a plurality of video frames corresponding to one silent audio frame. As yet another example, where a plurality of audio frames corresponds to one video frame, video encoder 28 may skip encoding of the video frame when each of the audio frames to which the video frame corresponds are silent audio frames. Video encoder 28 may also use a combination of any or all of the example methods described above to reduce the encoding rate of one or more video frames corresponding to one or more audio frames that include metadata indicating that the audio frames do not include speech data.

Video encoder 28, video decoder 48, audio encoder 26, audio decoder 46, audio codec 56, and video codec 58 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined audio encoder/decoder (CODEC). An apparatus including video encoder 28, video decoder 48, audio encoder audio encoder 26, audio decoder 46, audio codec 56, and/or video codec 58 may comprise an integrated circuit, a microprocessor, and/or a wireless communication device, such as a cellular telephone.

As examples of modified mode encoding, a video encoder may generally reduce the encoding rate for the video frame, for example, by skipping encoding of the video frames or other video units, reducing a bitrate for encoding of the video frame or video unit, increasing a quantization parameter (QP)

for encoding of the video frame, or reducing a frame rate for encoding of a plurality of video frames corresponding to a consecutive sequence of silent audio frames. In this manner, the techniques of this disclosure may improve efficiency of bandwidth utilization, in that more bandwidth can be allocated to encoding video frames associated with speech data from encoding of video frames corresponding to silent audio frames.

Figure 2:
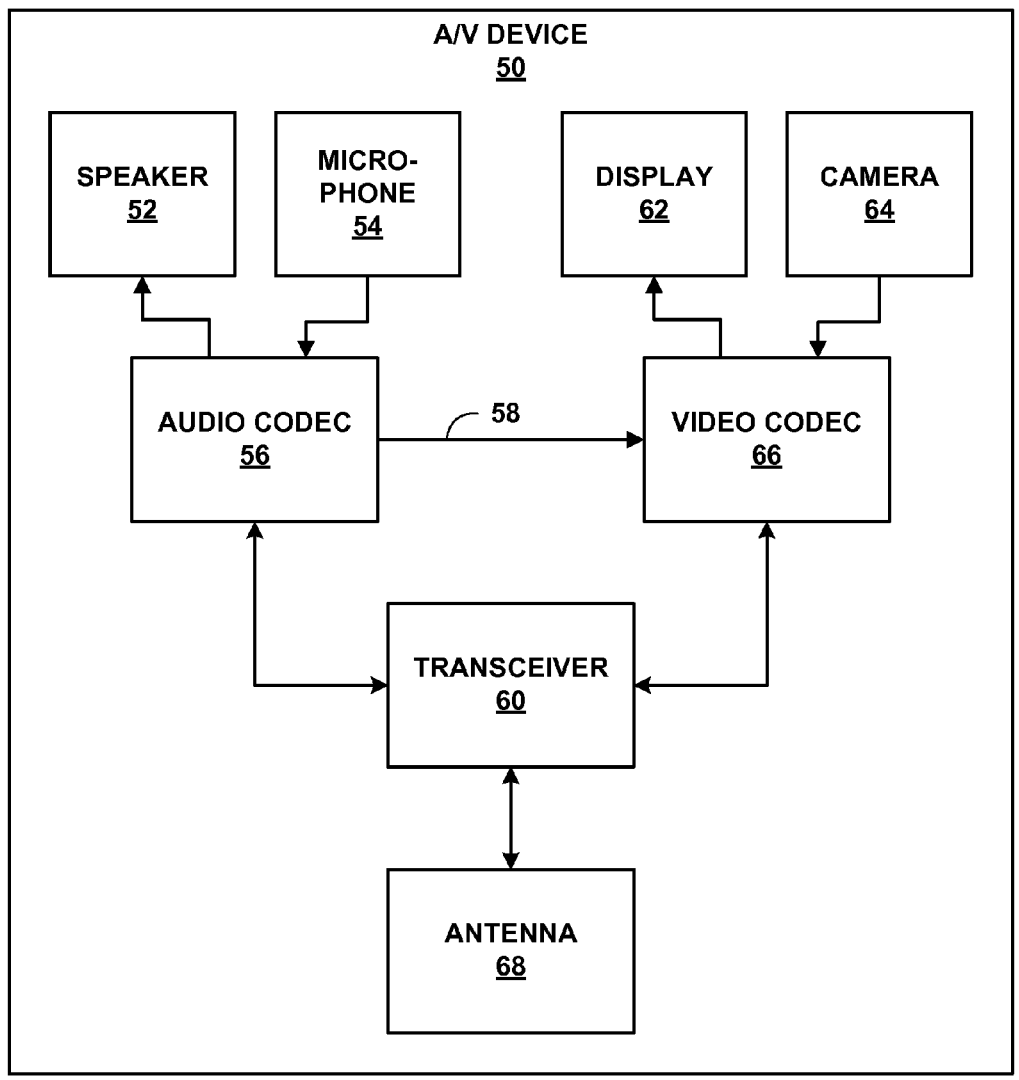
FIG. 2 is a block diagram illustrating an example audio/video device configured to encode and decode audio and video data, as well as both transmit and receive encoded audio and video data.

FIG. 2 is a block diagram illustrating an example audio/video device 50 that is capable of encoding and decoding audio and video data, as well as both transmitting and receiving encoded audio and video data. A/V device 50 may comprise, for example, a video teleconference system or other device for video telecommunication, such as a personal computer, personal digital assistant (PDA), wireless communication handset, or the like. In the example of FIG. 2, A/V device 50 includes speaker 52, microphone 54, display 62, and camera 64 as user interfaces. A/V device 50 also includes audio codec 56 and video codec 66. This disclosure uses the term "codec" to refer to a unit or module comprising both an encoder and a decoder. Accordingly, audio codec 56 may encode audio data and decode encoded audio frames. Likewise, video codec 66 may encode video data and decode encoded video frames. In some examples, audio codec 56 may comprise a vocoder, such as a vocoder configured to perform DTX mode audio encoding of speech data and non-speech (such as silence or speechless audio) data.

Audio codec 56 receives audio data from microphone 54. In accordance with the techniques of this disclosure, audio codec 56 may encode the audio data as one or more audio frames and send the encoded audio frames to video codec 66. In particular, audio codec 56 may include metadata in each of the audio frames that indicates whether the audio frame comprises speech data or not. For example, audio codec 56 may include a frame type value in an encoded audio frame that indicates whether the audio frame includes speech data or whether the audio frame is "silent," that is, does not include speech data. Audio codec 56 may also include a SID in an encoded audio frame to indicate that the audio frame does not include speech data, for the purpose of encoding mere background noise.

Audio codec 56 sends encoded audio frames to video encoder 66. Video encoder 66 may make encoding decisions based on data from encoded audio frames received from audio codec 56. For example, video encoder 66 may analyze encoded audio frames to determine whether the audio frames include speech data, e.g., by checking a frame type value and/or a SID value in the encoded audio frames. In particular, video encoder 66 may make encoding decisions for video frames received from camera 64 corresponding to the encoded audio frames.

For example, for video frames corresponding to encoded audio frames that include speech data, video encoder 66 may encode the video frames according to a first coding mode. In the first coding mode, video encoder 66 may encode the video frames normally, e.g., at a predetermined bitrate and/or predetermined frame rate. However, for video frames corresponding to encoded audio frames that do not include speech data, video encoder 66 may encode the video frames using a second coding mode different from the first coding mode. For example, during encoding in the second, different coding mode, video encoder 66 may reduce a frame rate, reduce a bitrate, increase a quantization parameter, or skip encoding of one or more video frames corresponding to one or more silent audio frames, or use any combination of such methods to reduce the encoding rate.

Audio codec 56 may send encoded audio frames to transmitter/receiver (transceiver) 60, and video codec 66 may send encoded video frames to transceiver 60. Alternatively, in some examples, audio codec 56 may only send encoded audio frames to video codec 66, and video codec 66 may forward the encoded audio frames along with corresponding encoded video frames to transceiver 60. In any case, transceiver 60 transmits encoded audio and video frames using antenna 68. In this manner, A/V device 50 may transmit encoded audio and video frames, e.g., to another, different A/V device, which may be similar to A/V device 50. Although generally described with respect to a transceiver that transmits encoded audio and video frames wirelessly via an antenna, it should be understood that the techniques of this disclosure also apply to sending and receiving coded data via wired connections.

A/V device 50 may also receive encoded audio and video frames at antenna 68 with transceiver 60. In one example, when transceiver 60 receives an encoded audio frame, transceiver 60 sends the encoded audio frame to audio codec 56 for decoding, and when transceiver 60 receives an encoded video frame, transceiver 60 sends the encoded video frame to video codec 66. In another example, transceiver 60 may send encoded audio frames and encoded video frames to video codec 66, and video codec 66 may forward the encoded audio frames to audio codec 56.

Audio codec 56 decodes encoded audio frames and video codec 66 decodes encoded video frames. In some examples, encoded audio frames and encoded video frames include timestamps to indicate correspondence between the audio and video frames. In such examples, audio codec 56 and video codec 66 may send the decoded audio and video frames to speaker 52 and display 62, respectively, in accordance with the timestamps or sequence identifiers. In some examples, A/V device 50 may further include a clock or other synchronization unit to ensure that corresponding audio and video frames are played simultaneously by speaker 52 and display 62.

Speaker 52 may correspond to one or more speakers or other units for producing sound from audio data. Display 62 may comprise one or more video displays such as, for example, a liquid crystal display (LCD) television or monitor, a plasma television or monitor, a cathode ray tube (CRT) television or monitor, a projector, or the like. Speaker 52 and/or display 62 may be external to A/V device 50 in some examples, in which case speaker 52 and/or display 62 may be coupled to A/V device 50 by wired or wireless connections.

Figure 3:
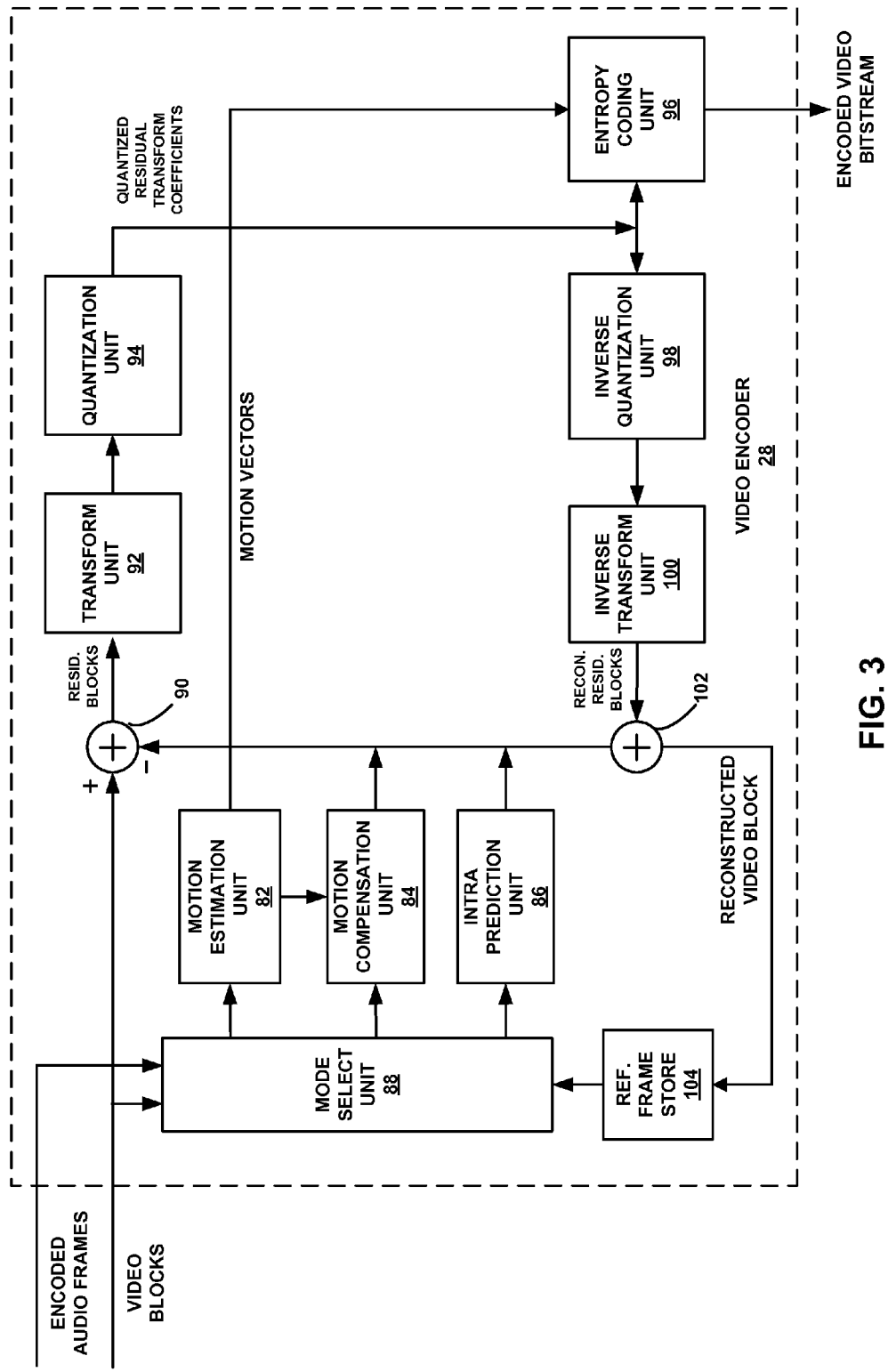
FIG. 3 is a block diagram illustrating an example of a video encoder that implements techniques for encoding video data based on silence information of corresponding encoded audio data.

FIG. 3 is a block diagram illustrating an example of a video encoder 28 that may implement techniques for encoding a video frame based on silence information of a corresponding encoded audio frame, consistent with this disclosure. Although described as video encoder 28 of A/V source device 20 (FIG. 1), the video encoder depicted in FIG. 3 may be used in other contexts and by other devices. For example, video codec 66 (FIG. 2) may include a video encoder similar to video encoder 28 as depicted in FIG. 3. In addition, other arrangements of components may be used by a video encoder that performs similar functions. Video encoder 28 may perform in accordance with any known video standard, e.g., motion picture expert group (MPEG)-2, MPEG-4, International Telecommunication Union (ITU) H.263, ITU H.264, advanced video coding (AVC), or the like, intra- and/or inter-coding of blocks within video frames, video slices, block sequences (e.g., a group of pictures), or other independently coded units of video data. Intra-coding relies on spatial prediction to reduce or remove spatial redundancy in video within a given video frame. Inter-coding relies on temporal prediction to reduce or remove temporal redundancy in video within adjacent frames of a video sequence.

Intra-mode (I-mode) may refer to any of several spatial based compression modes and inter-modes such as prediction (P-mode) or bi-directional (B-mode) may refer to any of several temporal-based compression modes. The techniques of this disclosure may be applied both during inter-coding and intra-coding.

As shown in FIG. 3, video encoder 28 receives a current video block within a video frame to be encoded. In the example of FIG. 3, video encoder 28 includes motion compensation unit 84, motion estimation unit 82, intra prediction unit 86, mode select unit 88, reference frame store 104, summer 90, transform unit 92, quantization unit 94, and entropy coding unit 96. For video block reconstruction, video encoder 28 also includes inverse quantization unit 98, inverse transform unit 100, and summer 102. A deblocking filter (not shown in FIG. 3) may also be included to filter block boundaries to remove blockiness artifacts from reconstructed video. If desired, the deblocking filter would typically filter the output of summer 102.

During the encoding process, video encoder 28 receives a video frame, slice, or sequence of macroblocks (e.g., group of pictures) to be coded, which may generally be referred to as a coded unit or video unit. The frame, slice, or sequence may be divided into multiple video blocks. In accordance with the techniques of this disclosure, each of the video blocks corresponds to an encoded audio frame. Mode select unit 88 initially determines whether the audio frame to which a video block corresponds contains speech data. For example, mode select unit 88 may analyze a frame type value for an audio frame to determine whether the frame type value indicates that the audio frame includes speech data. When mode select unit 88 determines that an encoded audio frame does not include speech data, mode select unit 88 may select a first mode, which may be a normal encoding mode. When mode select unit 88 determines that an encoded audio frame does not include speech data, mode select unit 88 may select a second mode different from the first mode. In the second mode, video encoder 28 may reduce a coding rate for corresponding video coded units. When mode select unit 88 determines that the encoded audio frame includes speech data, mode select unit 88 may cause video encoder 28 to encode the video coded unit as normal.

Mode select unit 88 may control encoding of the video coded unit by directing motion estimation unit 82, motion compensation unit 84, and intra prediction unit 86 to encode one or more blocks of the coded unit. Mode select unit 88 also determines whether to encode video data in a first encoding mode or a second, different encoding mode, e.g., a reduced quality encoding mode to save bandwidth, based upon whether corresponding audio data includes speech data. Motion estimation unit 82 and motion compensation unit 84 perform inter-predictive coding of the received video block relative to one or more blocks in one or more reference frames, stored in reference frame store 104, to provide temporal compression. Intra prediction unit 86 performs intra-predictive coding of the received video block relative to one or more neighboring blocks in the same frame or slice as the block to be coded to provide spatial compression.

Mode select unit 88 may select one of the coding modes, intra or inter, e.g., based on error results, and provides the resulting intra- or inter-coded block to summer 90 to generate residual block data and to summer 102 to reconstruct the encoded block for use as a reference frame. In accordance with the techniques of this disclosure, mode select unit 88 also determines whether to encode video blocks according to received encoded audio frames corresponding to the video blocks.

In particular, mode select unit 88 may receive encoded audio frames, e.g., from an audio encoder or audio codec. Each of the encoded audio frames may include metadata that indicates whether the encoded audio frame includes speech data. Mode select unit 88 is configured to analyze the metadata of an encoded audio frame to determine whether the encoded audio frame includes speech data. Based on this determination, mode select unit 88 may determine whether to encode corresponding video frames in a first mode, e.g., normally, or whether to encode the video frames in a second mode, e.g., by reducing an encoding rate for the corresponding video frames. The first mode and the second mode may each include both intra- and/or inter-prediction mode encoding. Mode select unit 88 may, for example, be configured to reduce the encoding rate by reducing a frame rate, reducing a bitrate, increasing a quantization parameter, skipping encoding of video frames corresponding to the silent audio frame, or any combination of these reductions in encoding rate and/or other methods for reducing an encoding rate for coding in the second mode.

During a sequence of silent audio frames, mode select unit 88 may determine to skip encoding of each of the video frames corresponding to the sequence of silent audio frames. Accordingly, in some examples, mode select unit 88 may select an intra-encoding mode for a video frame corresponding to an audio frame that includes speech data following such a sequence of silent audio frames by default. In other examples, mode select unit 88 may determine whether an intra- or inter-encoding mode would most efficiently encode the video frame corresponding to a speech audio frame following a sequence of silent audio frames.

For example, mode select unit 88 may attempt to inter-encode the video frame with reference to a previously encoded reference frame, calculate a difference value (e.g., sum of absolute difference, sum squared difference, mean absolute difference, or mean squared difference) between a reconstruction of the inter-encoded video frame and the original video frame, and determine whether the difference exceeds a threshold. When the difference exceeds the threshold, mode select unit 88 may select a mode that causes video encoder 28 to intra-encode the video frame, but when the difference does not exceed the threshold, mode select unit 88 may select a mode that causes video encoder 28 to inter-encode the frame. The threshold used to determine whether to inter-encode or intra-encode may vary according to the selected encoding mode, which relates to whether corresponding audio data includes speech data or not. For example, the threshold of a first encoding mode, selected by mode select unit 88 for encoding video data corresponding to audio data that does not include speech, may be configured so as to cause video encoder 28 to be more likely to inter-encode the video data. However, the threshold of a second encoding mode, selected by mode select unit 88 to encode video data corresponding to audio data that includes speech, may be configured to cause video encoder 28 to be more likely to intra-encode the video data. In this manner, mode select unit 88 may select an encoding mode with a threshold that is configured to cause video encoder 28 to be more or less likely to intra-encode video data, which may result in a bandwidth savings for the encoding mode having the threshold configured to cause video encoder 28 to be more likely to inter-encode video data corresponding to silent audio data, that is, audio data without speech.

Motion estimation unit 82 and motion compensation unit 84 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics.

A motion vector may also indicate displacement of a partition of a macroblock. Motion compensation may involve fetching or generating the predictive block based on the motion vector determined by motion estimation. Again, motion estimation unit 82 and motion compensation unit 84 may be functionally integrated.

Motion estimation unit 82 calculates a motion vector for the video block of an inter-coded frame by comparing the video block to video blocks of a reference frame in reference frame store 104. Motion compensation unit 84 may also interpolate sub-integer pixels of the reference frame, e.g., an I-frame or a P-frame. The ITU H.264 standard refers to reference frames as "lists." Therefore, data stored in reference frame store 104 may also be considered lists. Motion estimation unit 82 compares blocks of one or more reference frames (or lists) from reference frame store 104 to a block to be encoded of a current frame, e.g., a P-frame or a B-frame. When the reference frames in reference frame store 104 include values for sub-integer pixels, a motion vector calculated by motion estimation unit 82 may refer to a sub-integer pixel location of a reference frame. Motion estimation unit 82 sends the calculated motion vector to entropy coding unit 96 and motion compensation unit 84. The reference frame block identified by a motion vector may be referred to as a predictive block. Motion compensation unit 84 calculates error values for the predictive block of the reference frame.

Mode select unit 88 may be configured to select an encoding mode for encoding video data relative to whether corresponding audio data includes speech before selecting an inter-encoding or intra-encoding mode. Accordingly, the initial mode selection, i.e., the selection between modes based on whether audio data corresponding to the video data includes speech, may result in a decision on an encoding mode that is configured differently with respect to how the decision to inter-encode or intra-encode the video data is made. Whether to code a particular video frame as an I-frame or a P-frame may be decided based on an Intraframe period, network capacity, quality of output, or other factors. I-frames typically occupy more bits, and therefore, when mode select unit 88 determines that the audio data corresponding to the video data for which the mode selection is being made, mode select unit 88 may select a mode that is configured to encode relatively more P-frames, e.g., by the selected mode having a configured Intraframe period, configured SAD quality thresholds, or by any other configuration that causes video encoder 28 to select relatively more P-frames. This mode selection criteria may thereby save bandwidth, as mode select unit 88 will more likely select the mode that is configured to cause video encoder 28 to encode a frame as a P-frame.

Furthermore, video encoder 28 additionally performs an encoding mode decision as to how to encode individual macroblocks of a frame after deciding whether to encode the frame using inter-mode or intra-mode encoding. The encoding mode decision for macroblocks is different for I-frames and P-frames. With respect to H.264, for example, the mode decision for an individual macroblock of a P-frame is made based on SAD whether to encode the macroblock using inter-encoding or intra-encoding. Intra-encoded macroblocks typically occupy more bits than inter-encoded macroblocks, so when the audio data corresponding to the video data is silent, i.e., contains no speech data, the selected encoding mode may cause video encoder 28 to be more likely to inter-encode the macroblocks, which may thereby reduce bandwidth consumption. For I-frames, video encoder 28 also makes a prediction mode selection based on SAD. The prediction mode for macroblocks of an I-frame can result in encoding 4×4 pixel partitions of a macroblock individually, or encoding each 16×16 macroblock as a whole. Typically, the 4×4 pixel partition encoding mode results in more bit usage than the 16×16 encoding mode. Accordingly, when there is silence in audio data, the selected encoding mode may cause video encoder 28 to be more likely to encode macroblocks of an I-frame in the 16×16 encoding mode, rather than the 4×4 encoding mode.

Motion compensation unit 84 may calculate prediction data based on the predictive block. Video encoder 28 forms a residual video block by subtracting the prediction data from motion compensation unit 84 from the original video block being coded. Summer 90 represents the component or components that perform this subtraction operation. Transform unit 92 applies a transform, such as a discrete cosine transform (DCT) or a conceptually similar transform, to the residual block, producing a video block comprising residual transform coefficient values. Transform unit 92 may perform other transforms, such as those defined by the H.264 standard, which are conceptually similar to DCT. Wavelet transforms, integer transforms, sub-band transforms or other types of transforms could also be used. In any case, transform unit 92 applies the transform to the residual block, producing a block of residual transform coefficients. The transform may convert the residual information from a pixel value domain to a transform domain, such as a frequency domain. In particular, transform unit 92 performs the transform according to a quantization parameter that indicates an amount of quantization to be applied during the transform. Mode selection unit 88 may adjust the quantization parameter based on whether audio data, corresponding to video data being encoded and quantized, includes speech data.

Quantization unit 94 quantizes the residual transform coefficients to further reduce bit rate. The quantization process may reduce the bit depth associated with some or all of the coefficients. In some examples, quantization unit 94 applies a quantization parameter QP during quantization of macroblocks of a particular video frame, where the QP value is determined according to whether a corresponding encoded audio frame includes speech data or is silent. For example, when the corresponding encoded audio frame includes speech, the QP value may be relatively low, whereas when the corresponding encoded audio frame does not include speech, e.g., is silent, the QP value may be relatively high.

Following quantization, entropy coding unit 96 entropy codes the quantized transform coefficients. For example, entropy coding unit 96 may perform content adaptive variable length coding (CAVLC), context adaptive binary arithmetic coding (CABAC), or another entropy coding technique. Following the entropy coding by entropy coding unit 96, the encoded video may be transmitted to another device or archived for later transmission or retrieval. The coded bitstream may include entropy coded residual transform coefficient blocks, motion vectors for such blocks, and other syntax elements including, for example, macroblock-type identifier values, coded unit headers indicating the maximum size of macroblocks in the coded unit, QP values, coded block pattern (CBP) values, and transform size flag values. In the case of context adaptive binary arithmetic coding, context may be based on neighboring macroblocks.

In some cases, entropy coding unit 96 or another unit of video encoder 28 may be configured to perform other coding functions, in addition to entropy coding. For example, entropy coding unit 96 may perform run length coding of the coefficients in a block or macroblock. In particular, entropy coding unit 96 may apply a zig-zag scan or other scan pattern to scan the transform coefficients in a macroblock and encode runs of zeros for further compression. Entropy coding unit 96 may also construct header information with appropriate syntax elements for transmission in the encoded video bitstream.

Inverse quantization unit 98 and inverse transform unit 100 apply inverse quantization and inverse transformation, respectively, to reconstruct the residual block in the pixel domain, e.g., for later use as a reference block. Motion compensation unit 84 may calculate a reference block by adding the residual block to a predictive block of one of the frames of reference frame store 104. Motion compensation unit 84 may also apply one or more interpolation filters to the reconstructed residual block to calculate sub-integer pixel values. Summer 102 adds the reconstructed residual block to the motion compensated prediction block produced by motion compensation unit 84 to produce a reconstructed video block for storage in reference frame store 104. The reconstructed video block may be used by motion estimation unit 82 and motion compensation unit 84 as a reference block to inter-code a block in a subsequent video frame.

Figure 4:
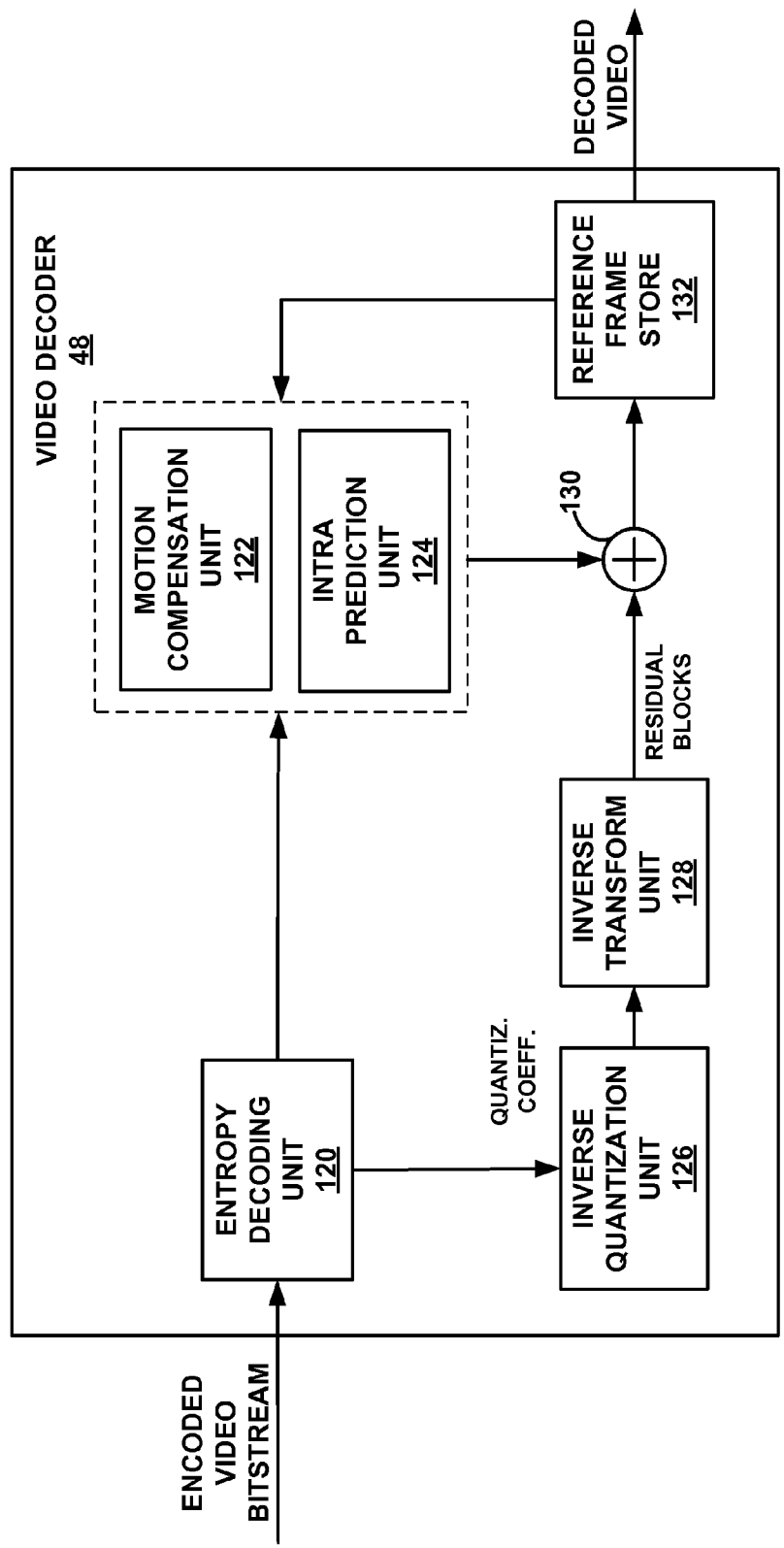
FIG. 4 is a block diagram illustrating an example configuration of components of a video decoder.

FIG. 4 is a block diagram illustrating an example configuration of components of video decoder 48. The encoded video sequence may include video frames and/or video macroblocks that are encoded according to corresponding encoded audio frames. Although described as video decoder 48 of A/V destination device 40 (FIG. 1), the video encoder depicted in FIG. 4 may be used in other contexts and by other devices. For example, video codec 66 (FIG. 2) may include a video decoder similar to video encoder 48 as depicted in FIG. 4. In the example of FIG. 4, video decoder 48 includes an entropy decoding unit 120, motion compensation unit 122, intra prediction unit 124, inverse quantization unit 126, inverse transformation unit 58, reference frame store 132 and summer 130. Video decoder 48 may, in some examples, perform a decoding pass generally reciprocal to the encoding pass described with respect to video encoder 28 (FIG. 3). Motion compensation unit 122 may generate prediction data based on motion vectors received from entropy decoding unit 120.

Entropy decoding unit 120 entropy-decodes the received bitstream to generate quantized coefficients and syntax elements (e.g., motion vectors, CBP values, QP values, and/or transform size flag values). Entropy decoding unit 120 may parse the bitstream to identify syntax information in coded units such as frames, slices and/or macroblock headers. The syntax information for a block is forwarded from entropy coding unit 52 to either motion compensation unit 122 or intra-prediction unit 55, e.g., depending on the coding mode of the block.

Motion compensation unit 122 may use motion vectors received in the bitstream to identify a prediction block in reference frames in reference frame store 132. Intra prediction unit 124 may use intra prediction modes received in the bitstream to form a prediction block from spatially adjacent blocks. Inverse quantization unit 126 inverse quantizes, i.e., de-quantizes, the quantized block coefficients provided in the bitstream and decoded by entropy decoding unit 120. The inverse quantization process may include a conventional process, e.g., as defined by the H.264 decoding standard. The inverse quantization process may also include use of a quantization parameter QP value calculated by encoder 50 for each macroblock to determine a degree of quantization and, likewise, a degree of inverse quantization that should be applied.

Inverse transform unit 128 applies an inverse transform, e.g., an inverse DCT, an inverse integer transform, or a conceptually similar inverse transform process, to the transform coefficients in order to produce residual blocks in the pixel domain. Motion compensation unit 122 produces motion compensated blocks, possibly performing interpolation based on interpolation filters. Identifiers for interpolation filters to be used for motion estimation with sub-pixel precision may be included in the syntax elements. Motion compensation unit 122 may use interpolation filters as used by video encoder 28 during encoding of the video block to calculate interpolated values for sub-integer pixels of a reference block. Motion compensation unit 122 may determine the interpolation filters used by video encoder 28 according to received syntax information and use the interpolation filters to produce predictive blocks.

Motion compensation unit 122 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (or lists) for each inter-encoded macroblock or partition, and other information to decode the encoded video sequence.

Summer 130 sums the residual blocks with the corresponding prediction blocks generated by motion compensation unit 122 or intra-prediction unit to form decoded blocks. If desired, a deblocking filter may also be applied to filter the decoded blocks in order to remove blockiness artifacts. The decoded video blocks are then stored in reference frame store 132, which provides reference blocks for subsequent motion compensation and also produces decoded video for presentation on a display device (such as video output 44 of FIG. 1).

By decoding encoded video frames corresponding to encoded audio frames, video decoder 48 may produce video data that varies according to whether corresponding audio frames include speech data. For example, when a sequence of encoded audio frames includes speech data, corresponding video data decoded by video decoder 48 may comprise a video stream with an average quality level. On the other hand, when a sequence of encoded audio frames do not include speech data, corresponding video data decoded by video decoder 48 may comprise lower-quality video data, staccato video frames, or what appears to be a frozen image as a result of a reduced frame rate, a reduced bitrate, an increased quantization parameter, or skipped video frames. The reduction in quality, however, may result in more efficient allocation of bandwidth.

Figure 5:
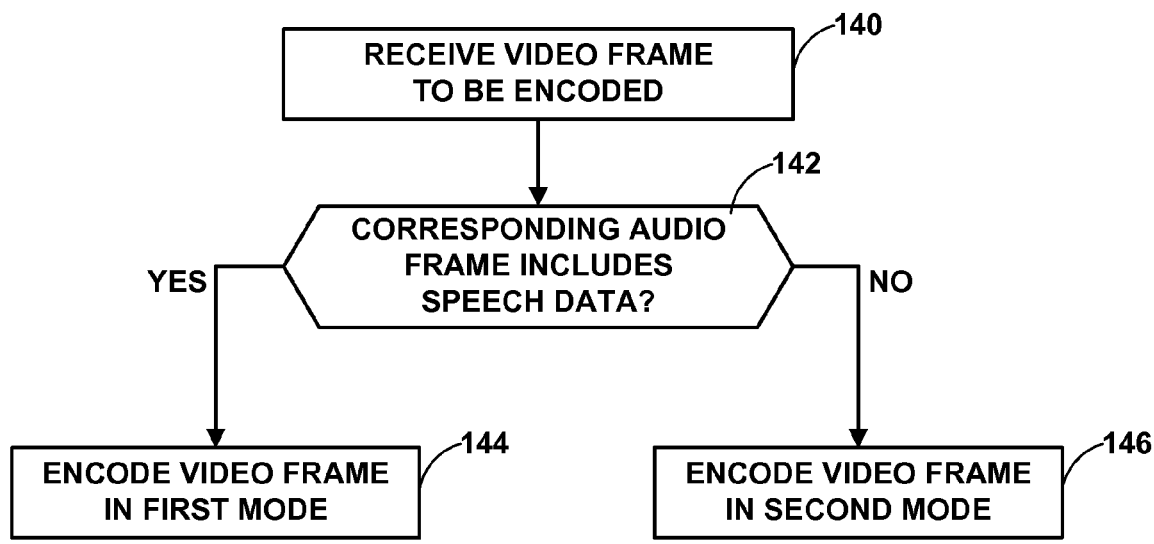
FIG. 5 is a flowchart illustrating an example method for encoding video data in either a first mode or a second mode.

FIG. 5 is a flowchart illustrating an example method for encoding video data in either a first mode or a second mode. In general, an encoder, such as video encoder 28, may perform the method of FIG. 5 to determine whether to encode video data corresponding to audio data in either a first mode or a second mode. In general, encoding the video data in the second mode may result in encoded data that consumes relatively less bandwidth relative to encoding the video data in the first mode. For example, the second mode may include encoding using a reduced bit rate, a modified quantization parameter to increase quantization, and/or a reduced frame rate.

Initially, mode select unit 88 receives a video frame to be encoded (140). Although generally described with respect to video frames, it should be understood that the techniques of FIG. 5 may also apply to other coded units, such as slices, groups of pictures, individual blocks, or other coded video units. Mode select unit 88 also determines whether information of an encoded audio frame corresponding to the video frame indicates that the audio frame is silent or contains speech data (142). The information may comprise, for example, a frame type value and/or a silence information descriptor (SID).

When mode select unit 88 determines that the information indicates that the encoded audio frame includes speech data ("YES" branch of 142), mode select unit 88 selects the first encoding mode (144). However, when mode select unit 88 determines that the information indicates that the encoded audio frame does not include speech data ("NO" branch of 142), mode select unit 88 selects the second encoding mode (146). In general, the second encoding mode may result in encoded data that consumes relatively less bandwidth than the first encoding mode. For example, the second encoding mode may utilize a lower bit rate, a modified quantization parameter that results in increased quantization, and/or a reduced frame rate. In some examples, the second encoding mode may comprise skipping encoding of video frames entirely.

An example method according to FIG. 5 includes receiving, with a video encoder, an indication of whether encoded audio data corresponding to video data to be encoded includes speech data, when the audio data includes speech data, encoding the corresponding video data in a first mode, and when the audio data does not include speech data, encoding the video data in a second mode different from the first mode. Encoding in the second mode may include any of reducing an encoding rate for encoding the video data relative to the first mode, reducing a bitrate for encoding the video data, adjusting a quantization parameter to cause a quantization unit of the video encoder to increase quantization of at least a portion of the video data, reducing a frame rate for encoding the video data to skip encoding of at least one video frame of the video data relative to the first mode, and/or skipping encoding of the video data that corresponds to audio data that does not include speech data.

Figure 6:
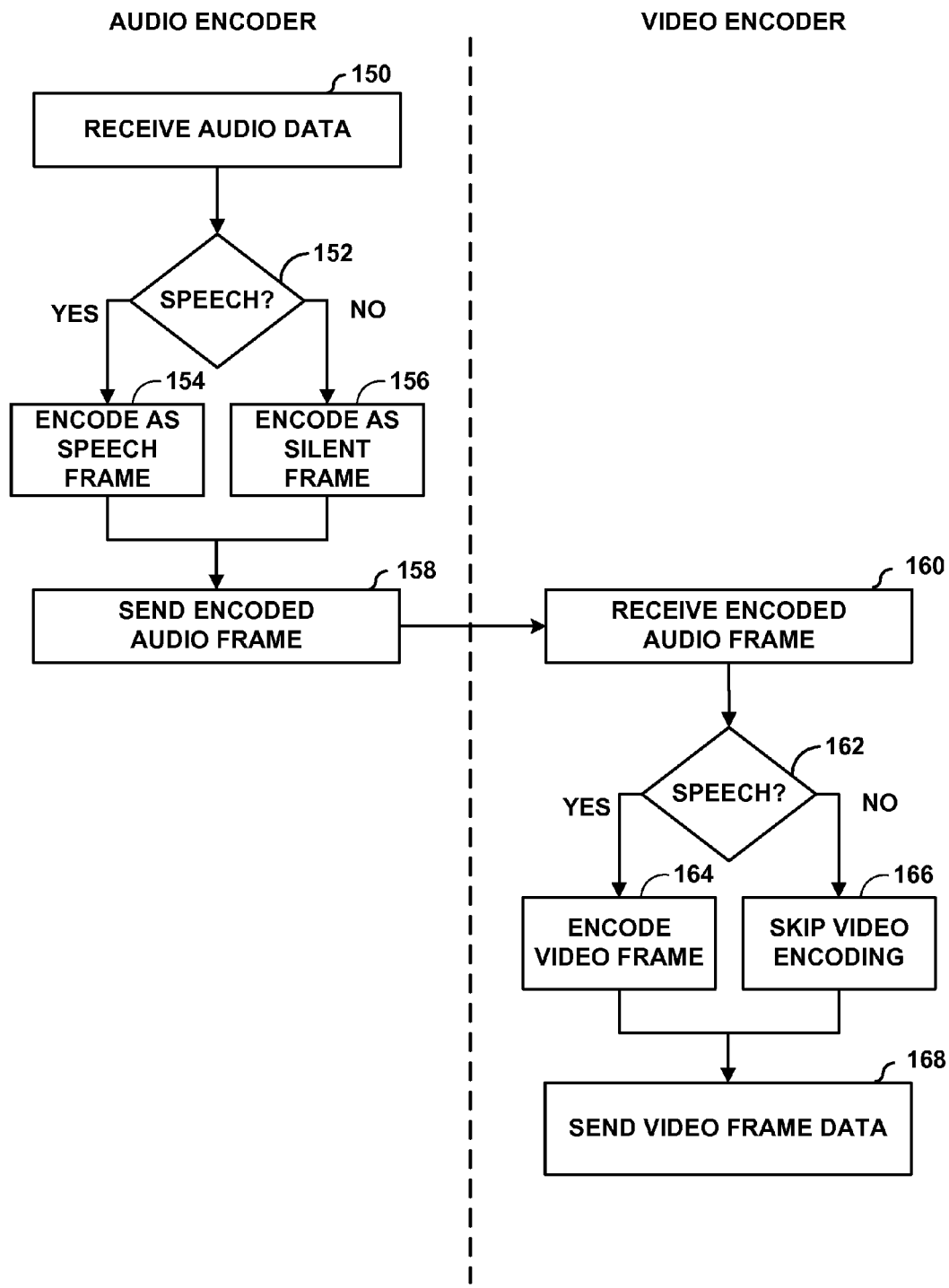
FIG. 6 is a flowchart illustrating an example method for encoding both audio and video data, such that the video data is encoded according to speech and silence information of the encoded audio data.

FIG. 6 is a flowchart illustrating an example method for encoding both audio and video data, such that the video data is encoded according to speech and silence information of the encoded audio data. For purposes of explanation, the method of FIG. 6 is described with respect to the example of A/V source device 20 of FIG. 1. However, it should be understood that other systems that include both an audio and a video encoder or audio and video codecs, such as a vocoder and a video encoder or video codec, may perform the method of FIG. 6.

Initially, audio encoder 26 receives audio data, e.g., from audio source 22 (150). Audio encoder 26 may encode the audio data according to any known audio-encoding standard, e.g., code excited linear prediction (CELP), DTX, Qualcomm CELP (QCELP), adaptive differential pulse-code modulation (ADPCM), Multipulse LPC with Maximum Likelihood Quantization (MPC-MLQ), pulse-code modulation (PCM), or enhanced variable rate CODEC (EVRC). Audio encoder 26 also determines whether the received audio data includes speech data (152) while encoding the audio data, e.g., by executing a voice activity detection (VAD) algorithm, e.g., in accordance with DTX mode audio encoding. In general, a VAD algorithm is executed to distinguish speech from non-speech noise and silence. VAD algorithms are designed to process audio signals to identify parameters corresponding to speech. Audio encoder 26 also divides the audio data into individually encoded audio frames.

When audio encoder 26 determines that a portion of the audio data contains speech data ("YES" branch of 152), audio encoder 26 encodes an audio frame comprising the audio data as a speech frame (154). In particular, audio encoder 26 may set a frame type value of the speech frame to indicate the presence of speech data in the encoded audio frame. For example, audio encoder 26 may set the frame type value to a particular encoding mode or encoding rate that indicates that speech data is present.

When audio encoder 26 determines that the portion of the audio data does not contain speech data ("NO" branch of 152), audio encoder 26 encodes the audio frame comprising the audio data as a silent frame (156). Although described as a silent frame, it should be understood that the encoded audio frame may comprise SID data, in accordance with DTX mode audio encoding. That is, the encoded silent frame may comprise non-speech background data, to improve a listener's comfort when listening to the eventually decoded version of the encoded audio data. Accordingly, in one example, to encode a silent frame, audio encoder 26 may set the frame type value to indicate that the audio frame includes no data. In another example, audio encoder 26 may include a SID in an encoded silent frame and set the frame type value to indicate presence of the SID, which also indicates that the encoded audio frame does not include speech data.

After audio encoder 26 encodes the audio frame, whether as a speech frame or silent frame, audio encoder 26 may send information from the encoded audio frame to video encoder 28 (158). In some examples, audio encoder 26 may also send the information from the encoded audio frame to transmitter 30, while in other examples, video encoder 28 may be configured to forward the information from the encoded audio frames to transmitter 30.

In any case, video encoder 28 may receive encoded audio frames from audio encoder 26 corresponding to video data to be encoded (160). The video data may comprise a video frame or a sequence of video frames corresponding to the audio data. Video encoder 28 may determine correspondence between an encoded audio frame and a video frame to be encoded by comparing timestamps of the encoded audio frame and the video frame. Video encoder 28 may then determine whether an encoded audio frame includes speech data (162). In one example, video encoder 28 may analyze a frame type value of the encoded audio frame to determine whether the encoded audio frame includes speech data.

For example, the frame type value may indicate that the encoded audio frame includes a SID or includes no data, in which case video encoder 28 may determine that the audio frame does not include speech data ("NO" branch of 162). Accordingly, video encoder 28 may skip encoding of a corresponding video frame (166). Alternatively, video encoder 28 may encode the video frame or a sequence of video frames corresponding to the audio frame at a reduced frame rate, e.g., a reduced frame rate, a reduced bitrate, or using an increased quantization parameter.

The frame type value may, instead, indicate that the encoded audio frame does include speech data, e.g., by describing an encoding rate of encoded speech data, in which case video encoder 28 may determine that the audio frame includes speech data ("YES" branch of 162). Accordingly, video encoder 28 may encode the video frame or a sequence of video frames corresponding to the audio frame at a normal encoding rate.

After encoding the video frame or sequence of video frames, or after indicating that encoding of a video frame was skipped, video encoder 28 may send the encoded video frame or other video data to transmitter 30 (168). In some examples, video encoder 28 may also forward encoded audio frames to transmitter 30. Transmitter 30 may then transmit the encoded audio and video frames, e.g., to a specified receiver or by broadcasting the encoded audio and video frames. In some examples, rather than transmitting or otherwise sending the encoded video data, video encoder 28 stores the video data in a computer-readable medium, e.g., for long-term storage or for the purpose of buffering the data for streaming.

Figure 7:
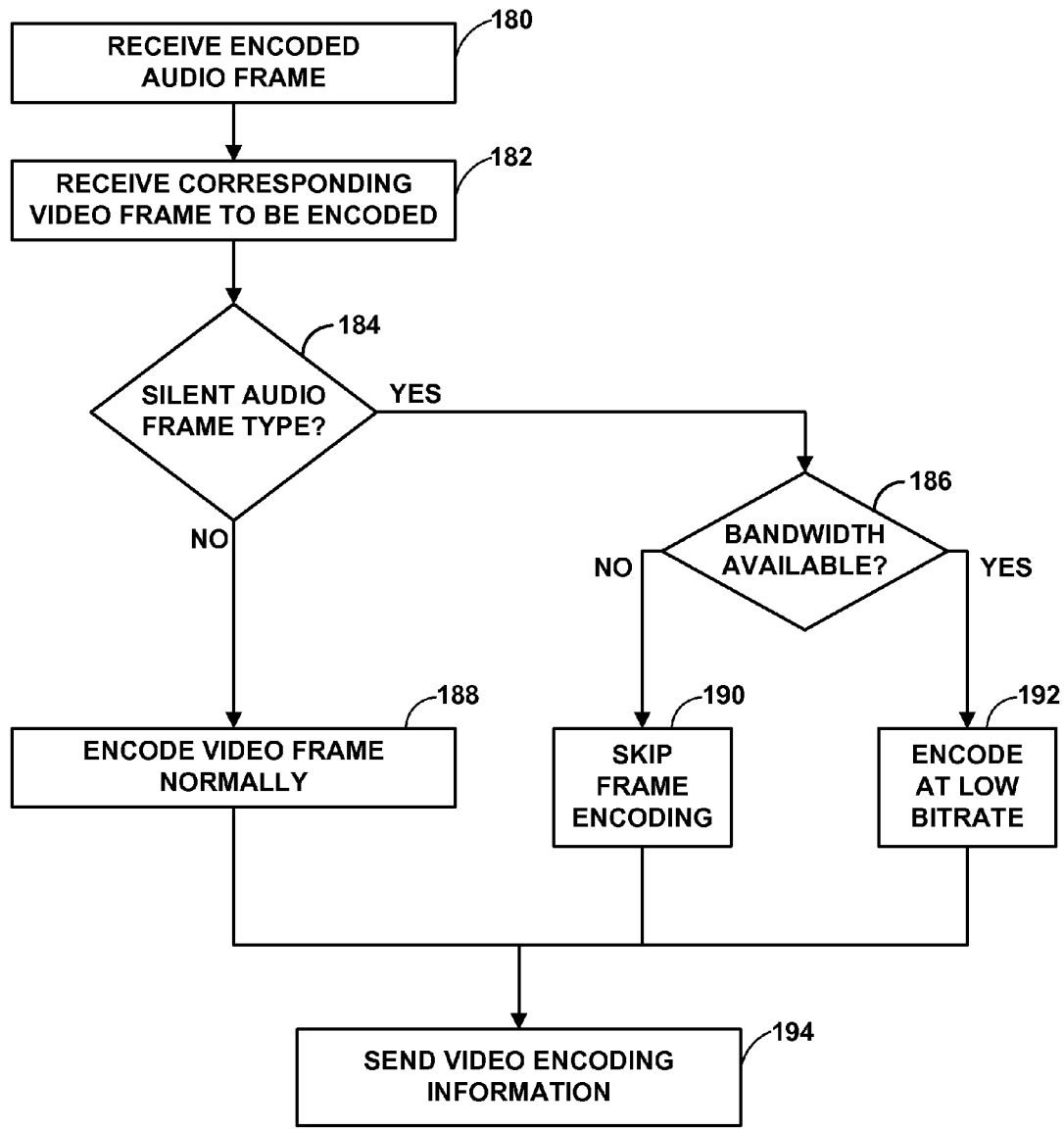
FIG. 7 is a flowchart illustrating an example method for encoding video data according to speech or silence information of corresponding encoded audio data.

FIG. 7 is a flowchart illustrating an example method for encoding video data according to speech or silence information of corresponding encoded audio data. For purposes of explanation, the method of FIG. 7 is described with respect to the example of A/V source device 20 of FIG. 1. However, it should be understood that other systems that include a video encoder or video codec, e.g., A/V device 50 of FIG. 2, may perform the method of FIG. 7.

Initially, video encoder 28 may receive information from an encoded audio frame (180), e.g., metadata from audio encoder 26 or a similar audio encoding unit, such as a vocoder or an audio codec. While in some examples, video encoder 28 may receive an entire encoded audio frame, in other examples, video encoder 28 may simply receive information indicating whether an audio frame includes speech data or is silent. Video encoder 28 may also receive a video frame to be encoded, e.g., from video source 24, that corresponds to the encoded audio frame (182). In various examples, video encoder 28 may receive a video frame to be encoded that corresponds to an encoded audio frame before, after, or simultaneously upon receiving the encoded audio frame.

Mode select unit 88 (FIG. 3) of video encoder 28 may determine that the video frame corresponds to the encoded audio frame. For example, mode select unit 88 may compare a timestamp of the video frame to a timestamp of the encoded audio frame and determine that the video frame corresponds to the encoded audio frame when the timestamps match. Mode select unit 88 may also determine whether the encoded audio frame comprises speech data (184). In particular, mode select unit 88 may determine a frame type value of the encoded audio frame. When the frame type value of the encoded audio frame indicates that the audio frame includes speech data ("NO" branch of 184), mode select unit 88 may determine that the encoded audio frame includes speech data. Accordingly, mode select unit 88 may select an intra- or inter-encoding mode for the corresponding video frame and cause motion estimation unit 82, motion compensation unit 84, and/or intra-prediction unit 86 to encode the corresponding video frame at a normal encoding rate (188).

On the other hand, when the frame type value of the encoded audio frame indicates that the encoded audio frame includes no data or includes a SID value, mode select unit 88 may determine that the encoded audio frame does not include speech data ("YES" branch of 184). In the example method of FIG. 7, mode select unit 88 then determines whether sufficient bandwidth exists for encoding the video frame, e.g., at a reduced encoding rate (186).

When mode select unit 88 determines that insufficient bandwidth exists for transmitting an encoded video frame, even at a reduced encoding rate ("NO" branch of 186), mode select unit 88 may cause motion estimation unit 82, motion compensation unit 84, and/or intra-prediction unit 86 to skip encoding of the video frame (190). For example, mode select unit 88 may cause motion estimation unit 82 to send one or more motion vectors for blocks of the video frame being encoded, such that the motion vectors indicate that no motion has occurred for the video frame, and mode select unit 88 may cause motion compensation unit 84 not to calculate a residual between a reference video frame and the video frame being encoded.

On the other hand, when mode select unit 88 determines that bandwidth is available for transmitting an encoded video frame at a reduced coding rate ("YES" branch of 186), mode select unit 88 reduces the encoding rate and causes motion estimation unit 82, motion compensation unit 84, and/or intra-prediction unit 86 to encode the corresponding video frame at the reduced encoding rate (e.g., a lower frame rate, lower bitrate, or higher quantization parameter) (192). For example, mode select unit 88 may send one or more signals to motion estimation unit 82, motion compensation unit 84, and/or intra-prediction unit 86 regarding a frame rate, bitrate, and/or quantization parameter to use when encoding the video frame.

In some examples, mode select unit 88 may additionally or alternatively base the decision as to whether to encode a video frame corresponding to a silent audio frame on a frame type to use for encoding of the video frame. For example, mode select unit 88 may determine to encode all frames that are designated for encoding as I-frames, regardless of whether the I-frames correspond to a silent audio frame. In such an example, mode select unit 88 may cause intra-prediction unit 86 to encode all video frames designated for intra-encoding, regardless of whether the video frames correspond to a silent audio frame, i.e., an audio frame that does not include speech data.

In any case, after video encoder 28 has encoded or skipped encoding of a video frame, video encoder 28 may send video encoding information (comprising either one or more encoded video frames or an indication of one or more skipped video frames) to transmitter 30 (194).

Figure 8A:
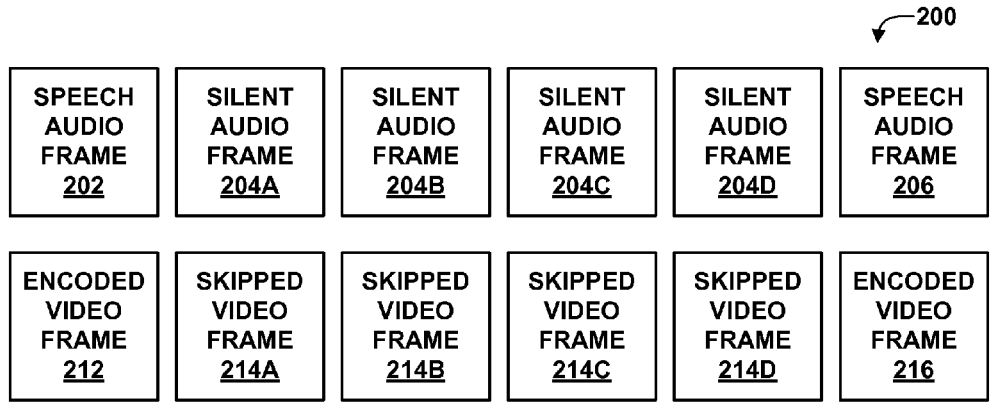
FIGS. 8A-8F are conceptual diagrams illustrating example sequences of encoded audio frames and corresponding encoded video frames.

FIGS. 8A-8F are conceptual diagrams illustrating example sequences of encoded audio frames and corresponding encoded video frames. FIG. 8A is an example sequence 200 of corresponding audio and video frames in which video frames corresponding to encoded audio frames including speech data are encoded at a normal encoding rate, but video frames corresponding to encoded audio frames that do not include speech data are skipped. In particular, sequence 200 includes speech audio frames 202 and 206 and silent audio frames 204A-204D (silent audio frames 204). An audio encoder, audio codec, or vocoder designates whether an encoded audio frame includes speech data through the use of metadata, such as a frame type value. Accordingly, speech audio frames 202, 206 include respective metadata indicating that encoded audio frames 202, 206 include speech data. However, silent audio frames 204 each includes metadata that indicates that the respective one of encoded audio frames 204 does not include speech data.

Likewise, in accordance with the techniques of this disclosure, a video encoder or video codec, such as video encoder 28, receives encoded audio frames 202, 204, 206, and determines whether each encoded audio frame includes speech data. In the example of FIG. 8A, video encoder 28 is configured to skip encoding of all video frames corresponding to silent audio frames, i.e., encoded audio frames that do not include speech data. Accordingly, video encoder 28 has produced encoded video fame 212, corresponding to speech audio frame 202, and encoded video frame 216, corresponding to speech audio frame 206. However, video encoder 28 skips encoding of video frames corresponding to silent audio frames 204, which results in skipped video frames 214A-214D (skipped video frames 214). Skipped video frames 214 may each include a minimal set of data, such as a header and a motion vector that indicates no motion. Skipped video frames 214 may each also include a coded block pattern that indicates that encoding of respective ones of skipped video frames 214 has been skipped.

Figure 8B:
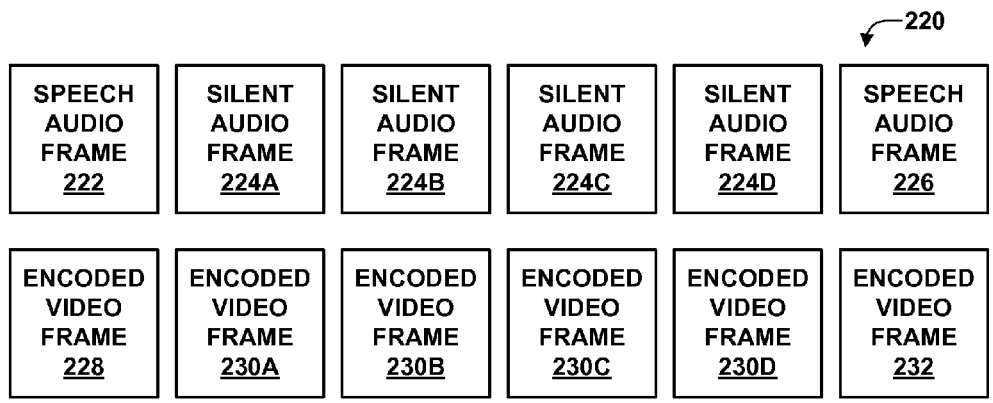

FIG. 8B is a block diagram illustrating an example sequence 220 of encoded audio and video frames. Sequence 220 includes speech audio frames 222 and 226 and silent audio frames 224A-224D (silent audio frames 224). Sequence 220 also includes encoded video frames 228 and 232, corresponding to speech audio frames 222 and 226, respectively. Encoded video frames 228 and 232 are encoded normally, e.g., according to an unaltered bitrate at an unaltered frame rate and with an unaltered quantization parameter. Sequence 220 also includes encoded video frames 230A-230D (encoded video frames 230) corresponding to respective ones of silent audio frames 224. Encoded video frames 230 are encoded using at least one of a reduced bitrate and/or a modified quantization parameter to increase quantization. In the example of FIG. 8B, the frame rate for encoded video frames 230 is not altered. Nevertheless, because of the reduced bitrate and/or the increased quantization parameter to encoded video frames 230, transmission of encoded video frames 230 may consume less bandwidth.

Figure 8C:
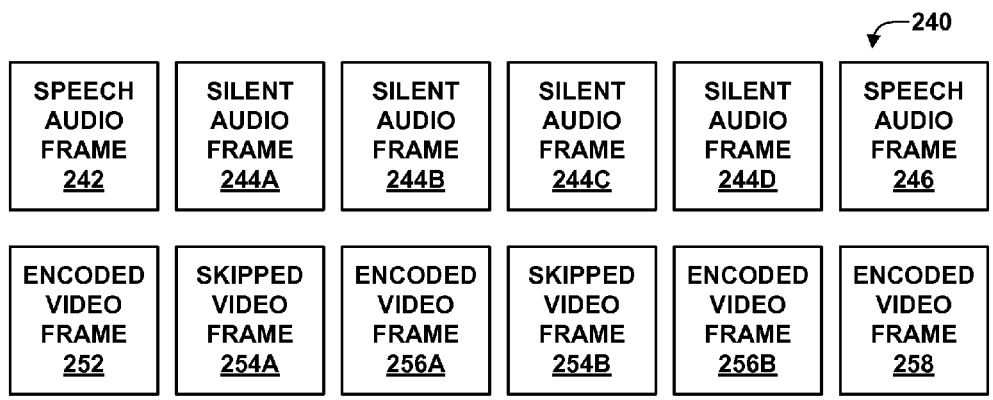

FIG. 8C is a block diagram illustrating an example sequence 240 of encoded audio and video frames. Sequence 240 includes speech audio frames 242 and 246 and silent audio frames 244A-244D (silent audio frames 244). Sequence 240 also includes encoded video frames 252 and 258 corresponding to speech audio frames 242 and 246. In addition, sequence 240 includes encoded video frames 256A-256B (encoded video frames 256) and skipped video frames 254A-254B (skipped video frames 254). Encoded video frames 256 and skipped video frames 254 correspond to respective ones of silent audio frames 244. In the example of FIG. 8C, video encoder 28 has been configured to reduce an encoding rate by reducing the frame rate by one-half. In addition, encoded video frames 256 may be encoded using a reduced bitrate and/or an increased quantization parameter.

Figure 8D:
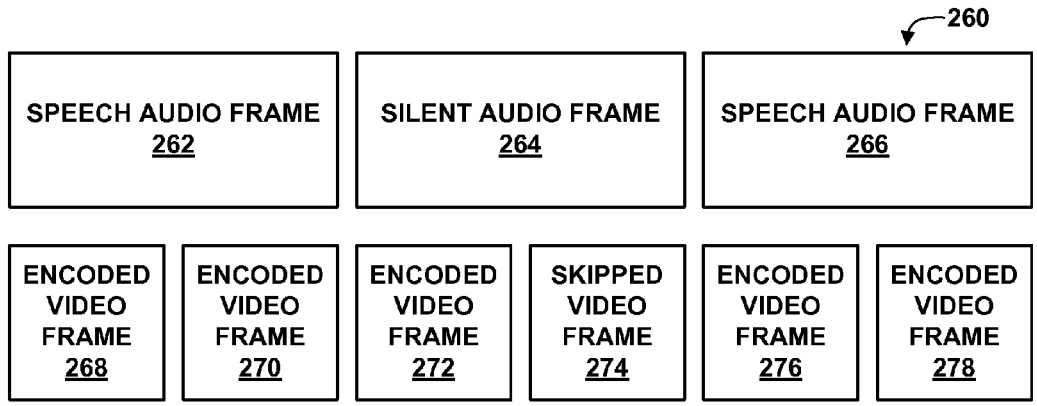

FIG. 8D is a block diagram illustrating an example sequence 260 of encoded audio and video frames in which a plurality of video blocks corresponds to one encoded audio frame. In the example of FIG. 8D, speech audio frame 262 corresponds to encoded video frames 268, 270, silent audio frame 264 corresponds to encoded video frame 272 and skipped video frame 274, and speech audio frame 266 corresponds to encoded video frames 276, 278. In this example, video encoder 28 is configured to reduce an encoding rate by reducing a frame rate for video frames corresponding to a silent audio frame, such as silent audio frame 264, which results in skipped video frame 274. In addition, encoded video frame 272 may be encoded using a reduced bitrate and/or an increased quantization parameter.

Figure 8E:
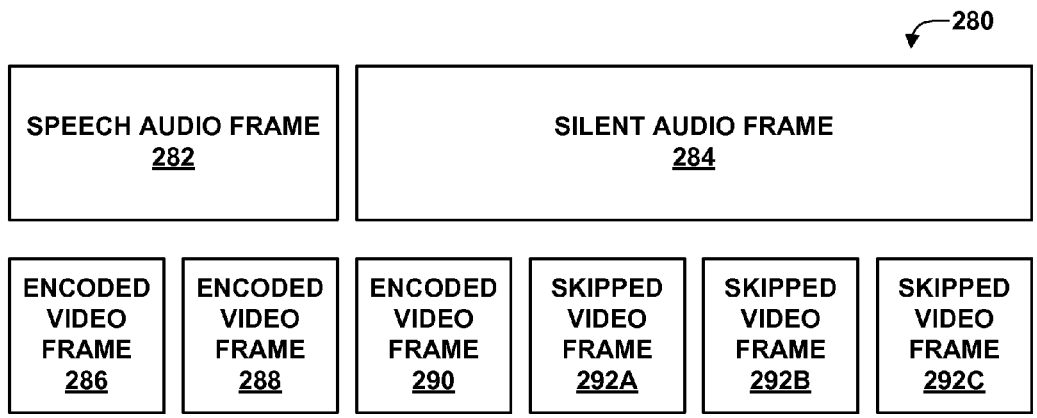

FIG. 8E is a block diagram illustrating another example sequence 280 of encoded audio and video frames in which a plurality of video blocks corresponds to one encoded audio frame. Not all of the video frames corresponding to speech audio frame 282 have been illustrated, for ease of explanation. As portrayed in the example of FIG. 8E, speech audio frame 282 corresponds to encoded video frames 286, 288, and silent audio frame 284 corresponds to encoded video frame 290 and skipped video frames 292A-292C (skipped video frames 292). In the example of FIG. 8E, video encoder 28 has been configured to encode only a first video frame of a plurality of video frames corresponding to a silent audio frame, such as silent audio frame 284. That is, video encoder 28 has encoded video frame 290 but skipped encoding of video frames 292. In some examples, video encoder 28 may further reduce the encoding rate by encoding video frame 290 at a reduced bitrate or using an increased quantization parameter.

Figure 8F:
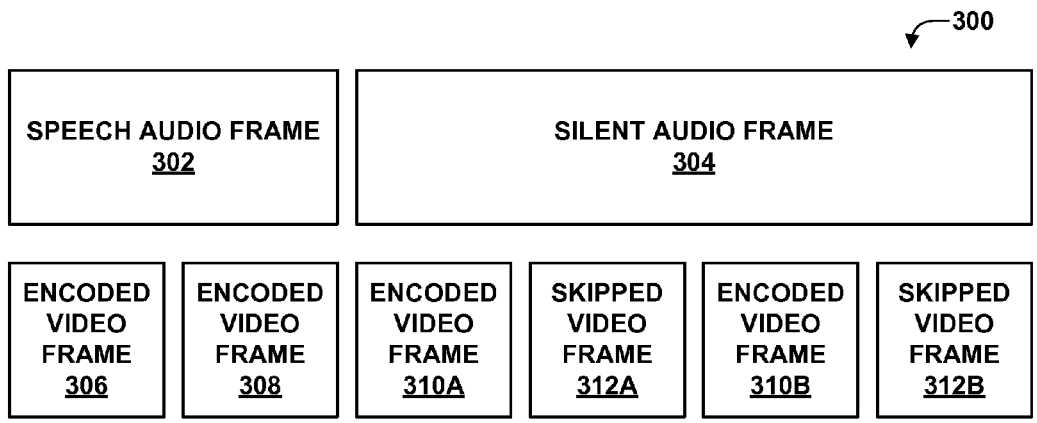

FIG. 8F is a block diagram illustrating another example sequence 300 of encoded audio and video frames in which a plurality of video blocks corresponds to one encoded audio frame. As portrayed in the example of FIG. 8F, speech audio frame 302 corresponds to encoded video frames 306 and 308, and silent audio frame 304 corresponds to encoded video frames 310A-310B (encoded video frames 310) and skipped video frames 312A-312B (skipped video frames 312). In the example of FIG. 8F, video encoder 28 has been configured to reduce a frame rate for encoding video frames corresponding to a silent audio frame, such as silent audio frame 304, by one-half. In other examples, video encoder 28 may be configured to reduce a frame rate by other factors, e.g., one-third, one-fourth, two-thirds, or three-fourths. Video encoder 28 may also encode encoded video frames 310 using a reduced bitrate and/or an increased quantization parameter.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media may includes computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a video encoder, an indication of whether an encoded audio frame corresponding to a video frame of video data to be encoded includes speech data;
when the encoded audio frame includes speech data, selecting a first mode for encoding the video data;
when the encoded audio frame does not include speech data, determining whether sufficient bandwidth exists for transmitting an encoded video frame;
in response to determining that sufficient bandwidth exists for transmitting an encoded video frame, selecting a second mode different from the first mode for encoding the video data based at least in part on whether intra-encoding or inter-encoding the video frame results in greater compression of the video frame; and
in response to determining that sufficient bandwidth does not exist for transmitting an encoded video frame, selecting a third mode different from the first mode and the second mode for encoding the video data based at least in part on whether intra-encoding or inter-encoding the video frame results in greater compression of the video frame.

2. The method of claim 1, wherein encoding the video data in a second mode comprises reducing an encoding rate for encoding the video data relative to the first mode.

3. The method of claim 2, wherein reducing the encoding rate for encoding the video data comprises reducing a bitrate for encoding the video data.

4. The method of claim 2, wherein reducing the encoding rate comprises adjusting a quantization parameter to cause a quantization unit of the video encoder to increase quantization of at least a portion of the video data.

5. The method of claim 1, wherein encoding the video data in a second mode comprises reducing a frame rate for encoding the video data to skip encoding of at least one video frame of the video data relative to the first mode.

6. The method of claim 1, further comprising determining whether intra-encoding or inter-encoding the video frame results in greater compression of the video frame by comparing degrees of compression when the video frame is intra-encoded and when the video frame is inter-encoded.

7. The method of claim 1, wherein the indication comprises a frame type value for the encoded audio frame that indicates whether the encoded audio frame includes speech data.

8. The method of claim 1, further comprising selecting an intra-encoding mode or an inter-encoding mode for the second mode or the third mode based at least in part on whether intra-encoding or inter-encoding the video frame results in greater compression of the video frame, and after selecting the intra-encoding mode or the inter-encoding mode for the second mode or the third mode, selecting one of a plurality of encoding modes for encoding macroblocks of the video data.

9. The method of claim 1, further comprising:
calculating a difference value between a reconstruction video frame and the video frame; and
selecting an intra-encoding mode or an inter-encoding mode for the second mode or the third mode based at least in part on a comparison between the difference value and a first threshold.

10. The method of claim 9, further comprising varying the first threshold according to whether the second mode or the third mode is selected for encoding the video data.

11. An apparatus comprising:
a video encoder configured to encode video data including a video frame in a first mode, a second mode, or a third mode,
wherein the video encoder comprises a mode select unit configured to receive an indication of whether an encoded audio frame corresponding to the video frame to be encoded includes speech data,
wherein when the encoded audio frame includes speech data, the mode select unit sends a first signal to the video encoder to encode the video data in the first mode, and
wherein when the encoded audio frame does not include speech data, the mode select unit is configured to determine whether sufficient bandwidth exists for transmitting an encoded video frame,
in response to determining that sufficient bandwidth exists for transmitting an encoded video frame, the mode select unit sends a second signal to the video encoder to encode the video data in the second mode different from the first mode, the second mode selected based at least in part on whether intra-encoding or inter-encoding the video frame results in greater compression of the video frame, and
in response to determining that sufficient bandwidth does not exist for transmitting an encoded video frame, the mode select unit sends a third signal to the video encoder to encode the video data in a third mode different from the first mode and the second mode, the third mode selected based at least in part on whether intra-encoding or inter-encoding the video frame results in greater compression of the video frame.

12. The apparatus of claim 11, wherein when the video encoder is configured to encode the video data in the second mode, the video encoder encodes the video data at a reduced encoding rate relative to the first mode.

13. The apparatus of claim 12, wherein when the video encoder is configured to encode the video data in the second mode, video encoder encodes the video data at a reduced bitrate.

14. The apparatus of claim 12, wherein when the video encoder is configured to encode the video data in the second mode, the video encoder adjusts a quantization parameter to cause a quantization unit of the video encoder to increase quantization of at least a portion of the video data.

15. The apparatus of claim 11, wherein the mode select unit is configured to determine whether intra-encoding or inter-encoding the video frame results in greater compression of the video frame by comparing degrees of compression when the video frame is intra-encoded and when the video frame is inter-encoded.

16. The apparatus of claim 11, wherein the indication comprises a frame type value for the encoded audio frame that indicates whether the encoded audio frame includes speech data.

17. The apparatus of claim 11, wherein the mode select unit is configured to select an intra-encoding mode or an inter-encoding mode for the second mode or the third mode based at least in part on whether intra-encoding or inter-encoding the video frame data results in greater compression of the video frame, and after the mode select unit selects the intra-encoding mode or the inter-encoding mode for the second mode or the third mode, the mode select unit is configured to select one of a plurality of encoding modes for encoding macroblocks of the video data.

18. The apparatus of claim 11, wherein the mode select unit is further configured to:
  calculate a difference value between a reconstruction video frame and the video frame; and
  select an intra-encoding mode or an inter-encoding mode for the second mode or the third mode based at least in part on a comparison between the difference value and a first threshold.

19. The apparatus of claim 18, wherein the mode select unit is configured to vary the first threshold according to whether the second mode or the third mode is selected for encoding the video data.

20. The apparatus of claim 11, wherein the apparatus comprises at least one of:
  an integrated circuit;
  a microprocessor; and
  a wireless communication device that includes the video encoder.

21. A non-transitory computer-readable storage medium encoded with instructions for causing a programmable processor of a video coding apparatus to:
  receive an indication of whether an encoded audio frame corresponding to a video frame of video data to be encoded includes speech data;
  when the encoded audio frame includes speech data, select a first mode for encoding the video data;
  when the encoded audio frame does not include speech data, determine whether sufficient bandwidth exists for transmitting an encoded video frame;
  in response to determining that sufficient bandwidth exists for transmitting an encoded video frame, select a second mode different from the first mode for encoding the video data based at least in part on whether intra-encoding or inter-encoding the video frame results in greater compression of the video frame; and
  in response to determining that sufficient bandwidth does not exist for transmitting an encoded video frame, select a third mode different from the first mode and the second mode for encoding the video data based at least in part on whether intra-encoding or inter-encoding the video frame results in greater compression of the video frame.

22. The non-transitory computer-readable storage medium of claim 21, wherein the instructions to encode the video data in a second mode comprise instructions to reduce an encoding rate for encoding the video data relative to the first mode.

23. The non-transitory computer-readable storage medium of claim 22, wherein the instructions to reduce the encoding rate for encoding the video data comprises instructions to reduce a bitrate for encoding the video data.

24. The non-transitory computer-readable storage medium of claim 22, wherein the instructions to reduce the encoding rate comprise instructions to adjust a quantization parameter to cause a quantization unit of the video coding apparatus to increase quantization of at least a portion of the video data.

25. The non-transitory computer-readable storage medium of claim 21, wherein the instructions to encode the video data in a second mode comprise instructions to reduce a frame rate for encoding the video data to skip encoding of at least one video frame of the video data relative to the first mode.

26. The non-transitory computer-readable storage medium of claim 21, further comprising instructions to determine whether intra-encoding or inter-encoding the video frame results in greater compression of the video frame by comparing degrees of compression when the video frame is intra-encoded and when the video frame is inter-encoded.

27. The non-transitory computer-readable storage medium of claim 21, wherein the indication comprises a frame type value for the encoded audio frame that indicates whether the encoded audio frame includes speech data.

28. The non-transitory computer-readable storage medium of claim 21, further comprising instructions to select an intra-encoding mode or an inter-encoding mode for the second mode or the third mode based at least in part on whether intra-encoding or inter-encoding the video frame results in greater compression of the video frame, and after selecting the intra-encoding mode or the inter-encoding mode for the second mode or the third mode, to select one of a plurality of encoding modes for encoding macroblocks of the video data.

29. The non-transitory computer-readable storage medium of claim 21, further comprising instructions to:
  calculate a difference value between a reconstruction video frame and the video frame; and
  select an intra-encoding mode or an inter-encoding mode for the second mode or the third mode based at least in part on a comparison between the difference value and a first threshold.

30. The non-transitory computer-readable storage medium of claim 29, further comprising instructions to vary the first threshold according to whether the second mode or the third mode is selected for encoding the video data.

* * * * *